United States Patent
Cai et al.

(10) Patent No.: US 10,701,665 B2
(45) Date of Patent: Jun. 30, 2020

(54) PAGING METHOD AND DEVICE

(71) Applicant: Huawei Technologies Co., Ltd., Shenzhen (CN)

(72) Inventors: Yu Cai, Shenzhen (CN); Da Wang, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/773,510

(22) PCT Filed: Nov. 26, 2015

(86) PCT No.: PCT/CN2015/095700
§ 371 (c)(1),
(2) Date: May 3, 2018

(87) PCT Pub. No.: WO2017/088150
PCT Pub. Date: Jun. 1, 2017

(65) Prior Publication Data
US 2018/0324749 A1    Nov. 8, 2018

(51) Int. Cl.
*H04W 68/02* (2009.01)
*H04W 76/28* (2018.01)
(Continued)

(52) U.S. Cl.
CPC .............. *H04W 68/02* (2013.01); *H04W 8/18* (2013.01); *H04W 68/00* (2013.01);
(Continued)

(58) Field of Classification Search
CPC ....... H04W 68/02; H04W 76/28; H04W 8/18; H04W 68/00; H04W 72/12; H04W 76/14; H04W 88/04
See application file for complete search history.

(56) References Cited

U.S. PATENT DOCUMENTS 8,320,398 B2    11/2012    Li et al.
8,527,017 B2    9/2013    Soliman et al.
(Continued)

FOREIGN PATENT DOCUMENTS

CN    101453788 A    6/2009
CN    102907139 A    1/2013
(Continued)

OTHER PUBLICATIONS

Google Scholar Search Results.*
(Continued)

*Primary Examiner* — Qun Shen
(74) *Attorney, Agent, or Firm* — Slater Matsil, LLP

(57) ABSTRACT

An embodiment method includes: obtaining, by a communications device, a DRX period of a first device and an identifier of the first device; determining, according to the DRX period of the first device and the identifier of the first device, a paging occasion on which the first device pages a second device; and transmitting, by the communications device, a first paging message on the paging occasion on which the first device pages the second device, where the first paging message is used by the first device to page the second device, and the communications device is the first device or the second device.

23 Claims, 4 Drawing Sheets

(51) Int. Cl.
*H04W 68/00* (2009.01)
*H04W 72/12* (2009.01)
*H04W 8/18* (2009.01)
*H04W 72/04* (2009.01)
*H04W 76/14* (2018.01)
*H04W 88/04* (2009.01)

(52) U.S. Cl.
CPC ....... *H04W 72/0446* (2013.01); *H04W 72/12* (2013.01); *H04W 76/28* (2018.02); *H04W 76/14* (2018.02); *H04W 88/04* (2013.01)

(56) References Cited

U.S. PATENT DOCUMENTS

| | | | | |
|---|---|---|---|---|
| 2008/0182596 A1* | 7/2008 | Wang | ................. | H04W 68/025 455/458 |
| 2010/0248752 A1* | 9/2010 | Yu | ................. | H04W 68/02 455/458 |
| 2011/0039553 A1* | 2/2011 | Willey | ................. | H04W 68/02 455/426.1 |
| 2013/0015953 A1* | 1/2013 | Hsu | ................. | H04W 4/08 340/7.46 |
| 2013/0130684 A1 | 5/2013 | Gomes et al. | | |
| 2013/0215809 A1* | 8/2013 | Chang | ................. | H04W 52/0235 370/311 |
| 2013/0242730 A1* | 9/2013 | Pelletier | ................. | H04W 28/0284 370/230 |
| 2013/0303203 A1 | 11/2013 | Wang et al. | | |
| 2014/0031063 A1* | 1/2014 | Park | ................. | H04W 8/186 455/456.1 |
| 2015/0063095 A1* | 3/2015 | Deng | ................. | H04W 24/08 370/221 |
| 2015/0103768 A1 | 4/2015 | Chen et al. | | |
| 2015/0327046 A1* | 11/2015 | Lee | ................. | H04W 56/002 370/338 |
| 2016/0007170 A1* | 1/2016 | Vaidya | ................. | H04W 68/02 370/312 |
| 2016/0044605 A1* | 2/2016 | Vajapeyam | ................. | H04W 52/322 370/311 |

FOREIGN PATENT DOCUMENTS

| | | |
|---|---|---|
| CN | 103378939 A | 10/2013 |
| EP | 2369883 A1 | 9/2011 |
| WO | 2008155739 A2 | 12/2008 |
| WO | 2011100497 A1 | 8/2011 |
| WO | 2011123755 A1 | 10/2011 |

OTHER PUBLICATIONS

3GPP TS 36.331 V12.7.0 (Sep. 2015), "3rd Generation Partnership Project;Technical Specification Group Radio Access Network; Evolved Universal Terrestrial Radio Access (E-UTRA);Radio Resource Control (RRC); Protocol specification," (Release 12), Sep. 2015, 453 pages.

3GPP TS 36.304 V12.6.0 (Sep. 2015), "3rd Generation Partnership Project;Technical Specification Group Radio Access Network; Evolved Universal Terrestrial Radio Access (E-UTRA); User Equipment (UE) procedures in idle mode," (Release 12), Sep. 2015, 38 pages.

3GPP TS 36.213 V12.7.0 (Sep. 2015), "3rd Generation Partnership Project;Technical Specification Group Radio Access Network; Evolved Universal Terrestrial Radio Access (E-UTRA); Physical layer procedures" (Release 12), Sep. 2015, 241 pages.

3GPP TS 36.211 V12.7.0 (Sep. 2015), "3rd Generation Partnership Project;Technical Specification Group Radio Access Network;Evolved Universal Terrestrial Radio Access (E-UTRA); Physical channels and modulation," (Release 12), Sep. 2015, 136 pages.

* cited by examiner

PAGING METHOD AND DEVICE

CROSS-REFERENCE TO RELATED APPLICATIONS

This application is a national stage of International Application No. PCT/CN2015/095700, filed on Nov. 26, 2015, which is hereby incorporated by reference in its entirety.

TECHNICAL FIELD

The present invention relates to the field of communications technologies, and in particular, to a paging method and a device.

BACKGROUND

With diversification of electronics, a requirement for wearable devices (WD) gradually increases. Because a WD has a relatively small battery capacity and a relatively low radio frequency capability, when the WD wants to connect to a network side device for data transmission, a communications device with a relatively high radio frequency capability, for example, user equipment (UE) with a relatively high radio frequency capability may be used as a relay node to assist the WD with the connection to the network side device for data transmission, so as to reduce power consumption of the WD.

When the WD is in an idle mode, if the network side device needs to send data to the WD, the network side device needs to page the UE connected to the WD, and the UE pages the WD at a paging moment of the WD. Currently, a solution for how the UE pages the WD has not been disclosed. Only a solution in which the network side device pages the UE is disclosed, that is, a paging occasion of the UE is calculated by using an international mobile subscriber identity (IMS) of the UE according to a discontinuous reception (DRX) mechanism, and then a paging message is sent to the UE on the paging occasion, so as to page the UE.

It is assumed that the UE pages, in a manner in which the network side device pages the UE, a plurality of WDs that transmit data to the network side device by using the UE. That is, the UE calculates paging occasions for the WDs according to IMSIs of the WDs. Because different WDs may have different IMSIs, the UE may need to page the plurality of WDs on different paging occasions, that is, the UE needs to occupy a relatively large quantity of network resources to page the WDs, thereby affecting normal service transmission of the UE.

SUMMARY

Embodiments of the present invention provide a paging method and a device, so as to reduce network resources occupied when communications devices perform paging.

To achieve the foregoing objective, the embodiments of the present invention use the following technical solutions.

According to a first aspect, an embodiment of the present invention provides a paging method. The method includes: obtaining, by a communications device, a discontinuous reception DRX period of a first device and an identifier of the first device. The method further includes determining, by the communications device according to the discontinuous reception DRX period of the first device and the identifier of the first device, a paging occasion on which the first device pages a second device. The second device transmits data to a network side device by using the first device. The method further includes transmitting, by the communications device, a first paging message on the paging occasion on which the first device pages the second device, where the first paging message is used by the first device to page the second device, and the communications device is the first device or the second device.

According to the paging method provided in this embodiment of the present invention, because the first device determines, according to the DRX period of the first device and the identifier of the first device, the paging occasion on which the first device pages the second device, paging occasions on which the first device pages a plurality of second devices that transmit data to the network side device by using the first device are the same, that is, the first device can page, on a same network resource, different second devices that transmit data to the network side device by using the first device, thereby reducing network resources occupied when the first device pages the second devices.

In a first possible implementation of the first aspect, the communications device is the first device, and the transmitting, by the communications device, a first paging message on the paging occasion on which the first device pages the second device includes: sending, by the communications device, the first paging message to the second device on the paging occasion on which the first device pages the second device.

With reference to the first aspect, in a second possible implementation of the first aspect, the communications device is the second device. Transmitting, by the communications device, a first paging message on the paging occasion on which the first device pages the second device includes receiving, by the communications device on the paging occasion on which the first device pages the second device, the first paging message sent by the first device.

With reference to any one of the first aspect, or the first possible implementation of the first aspect or the second possible implementation of the first aspect, in a third possible implementation, the identifier of the first device is an international mobile subscriber identity IMSI of the first device, or an SAE-temporary mobile subscriber identity S-TMSI of the first device, or an IMSI mod A of the first device, or an S-TMSI mod A of the first device, where a value of A is a sum of a maximum value of a system frame number and one, and mod represents a modulo operation.

With reference to any one of the first aspect, or the first possible implementation of the first aspect to the third possible implementation of the first aspect, in a fourth possible implementation, the determining, by the communications device according to the DRX period of the first device and the identifier of the first device, a paging occasion on which the first device pages a second device includes: determining, by the communications device, a first frame number according to the DRX period of the first device and the identifier of the first device; and determining, by the communications device according to the first frame number, the paging occasion on which the first device pages the second device.

With reference to the fourth possible implementation of the first aspect, in a fifth possible implementation, the determining, by the communications device, a first frame number according to the DRX period of the first device and the identifier of the first device includes: determining, by the communications device by using a first formula, the first frame number according to the DRX period of the first device and the identifier of the first device, where the first formula is the following:

$SFN \bmod (T \times M1) = (T/N) \times (UE\_ID \bmod N)$, where

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; and M1≤A/T, and M1 is an integer; and a value of A is a sum of a maximum value of a system frame number and one.

With reference to the fourth possible implementation of the first aspect, in a sixth possible implementation, the determining, by the communications device, a first frame number according to the DRX period of the first device and the identifier of the first device includes determining, by the communications device by using a second formula, the first frame number according to the DRX period of the first device and the identifier of the first device, where the second formula is the following:

$SFN \bmod (T \times M1) = (T/N) \times (UE\_ID \bmod N) + T \times (UE\_ID \bmod M1)$, where SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; and M1≤A/T, and M1 is an integer; and a value of A is a sum of a maximum value of a system frame number and one.

It should be noted that the first frame number is obtained through calculation by using the second formula in the sixth possible implementation of the first aspect, so that paging occasions determined for second devices according to the first frame number can be evenly distributed in the DRX period.

With reference to the fourth possible implementation of the first aspect, in a seventh possible implementation, the determining, by the communications device, a first frame number according to the DRX period of the first device and the identifier of the first device includes determining, by the communications device by using a third formula, the first frame number according to the DRX period of the first device and the identifier of the first device, where the third formula is the following:

$SFN \bmod (T \times M1) = (T/N \times M2) \times (\mathrm{floor}(UE\_ID/M2) \bmod (N/M2)) + T/N \times (M2-1)$, where SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

With reference to the fourth possible implementation of the first aspect, in an eighth possible implementation, the determining, by the communications device, a first frame number according to the DRX period of the first device and the identifier of the first device includes determining, by the communications device by using a fourth formula, the first frame number according to the DRX period of the first device and the identifier of the first device, where the fourth formula is the following:

$SFN \bmod (T \times M1) = (T/N) \times (UE\_ID \bmod N) + T/N \times (M2-1-(UE\_ID \bmod M2))$, where SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

With reference to the fourth possible implementation of the first aspect, in a ninth possible implementation, the determining, by the communications device, a first frame number according to the DRX period of the first device and the identifier of the first device includes determining, by the communications device by using a fifth formula, the first frame number according to the DRX period of the first device and the identifier of the first device, where the fifth formula is the following:

$SFN \bmod (T \times M1) = (T/N \times M2) \times (\mathrm{floor}(UE\_ID/M2) \bmod (N/M2)) + T/N \times (M2-1) + T \times (UE\_ID \bmod M1)$, where SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

With reference to the fourth possible implementation of the first aspect, in a tenth possible implementation, the determining, by the communications device, a first frame number according to the DRX period of the first device and the identifier of the first device includes determining, by the communications device by using a sixth formula, the first frame number according to the DRX period of the first device and the identifier of the first device, where the sixth formula is the following:

$SFN \bmod (T \times M1) = (T/N) \times (UE\_ID \bmod N) + T/N \times (M2-1-(UE\_ID \bmod M2)) + T \times (UE\_ID \bmod M1)$, where SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

It should be noted that, according to the formula in any one of the seventh possible implementation of the first aspect to the tenth possible implementation of the first aspect, first frame numbers determined by a plurality of adjacent first devices may be the same, and paging occasions determined for second devices by the plurality of adjacent first devices according to the first frame number are also the same, so that the plurality of adjacent first devices page the second devices on the same paging occasion, so as to save network resources.

With reference to any one of the fourth possible implementation of the first aspect to the tenth possible implementation of the first aspect, in an eleventh possible implementation, the determining, by the communications device according to the first frame number, the paging occasion on which the first device pages the second device includes determining, by the communications device, a first subframe in a radio frame whose frame number is the first frame number, where a subframe number of the first subframe is the same as a subframe number of a paging occasion on which the network side device pages the first device; and determining, by the communications device, that an M3th subframe after the first subframe is the paging occasion on which the first device pages the second device, where M3≥1, and M3 is an integer.

With reference to any one of the fourth possible implementation of the first aspect to the tenth possible implementation of the first aspect, in a twelfth possible implementation, the determining, by the communications device according to the first frame number, the paging occasion on which the first device pages the second device includes determining, by the communications device, that an M4th radio frame after a radio frame whose frame number is the first frame number is a first radio frame, where M4≥0, and M4 is an integer; determining, by the communications device, a first subframe in the first radio frame, where a subframe number of the first subframe is the same as a subframe number of a paging occasion on which the network side device pages the first device; and determining, by the communications device, that an M3th subframe after the first subframe is the paging occasion on which the first device pages the second device, where M3≥1, and M3 is an integer.

With reference to the eleventh possible implementation of the first aspect or the twelfth possible implementation of the first aspect, in a thirteenth possible implementation, the determining, by the communications device, that an M3th subframe after the first subframe is the paging occasion on which the first device pages the second device includes: determining, by the communications device, that the M3th subframe after the first subframe is a subframe of a physical random access channel PRACH; and determining, by the communications device, that a first subframe of a non-PRACH after the subframe of the PRACH is the paging occasion on which the first device pages the second device.

It should be noted that, according to the thirteenth possible implementation of the first aspect, the first device can avoid occupying the subframe of the PRACH, and call initiation of the first device remains unaffected.

With reference to any one of the fourth possible implementation of the first aspect to the tenth possible implementation of the first aspect, in a fourteenth possible implementation, the determining, by the communications device according to the first frame number, the paging occasion on which the first device pages the second device includes: determining, by the communications device, that an M4th radio frame after a radio frame whose frame number is the first frame number is a first radio frame, where M4≥1, and M4 is an integer; and determining, by the communications device in the first radio frame, that a subframe whose subframe number is M5 is the paging occasion on which the first device pages the second device, where 0≤M5≤9, and M5 is an integer.

With reference to the second possible implementation of the first aspect, in a fifteenth possible implementation, the obtaining, by a communications device, a DRX period of a first device and an identifier of the first device includes receiving, by the second device, the DRX period of the first device and the identifier of the first device that are sent by the first device or the network side device.

With reference to the first possible implementation of the first aspect, in a sixteenth possible implementation, before the sending, by the communications device, the first paging message to the second device on the paging occasion on which the first device pages the second device, the method further includes receiving, by the first device, a second paging message sent by the network side device, where the second paging message is used by the network side device to page the second device, and the second paging message includes an identifier of the second device; and determining, by the first device according to the identifier of the second device, that the first paging message needs to be sent to the second device.

With reference to the sixteenth possible implementation of the first aspect, in a seventeenth possible implementation, that the second paging message includes an identifier of the second device includes the second paging message includes a paging record of paging the first device by the network side device, where the paging record of paging the first device by the network side device includes the identifier of the second device.

With reference to the sixteenth possible implementation of the first aspect, in an eighteenth possible implementation, that the second paging message includes an identifier of the second device includes the second paging message includes a paging record of paging the second device by the network side device, where the paging record of paging the second device by the network side device includes the identifier of the second device.

According to a second aspect, an embodiment of the present invention provides a communications device. The communications device includes an obtaining unit, configured to obtain a discontinuous reception DRX period of a first device and an identifier of the first device. The communications device further includes a determining unit, configured to determine, according to the discontinuous reception DRX period of the first device and the identifier of the first device that are obtained by the obtaining unit, a paging occasion on which the first device pages a second device. The second device transmits data to a network side device by using the first device. The communications device further includes a transmission unit, configured to transmit a first paging message on the paging occasion on which the first device pages the second device and that is determined by the determining unit, where the first paging message is used by the first device to page the second device, and the communications device is the first device or the second device.

Because the communications apparatus provided in this embodiment of the present invention can determine, according to the DRX period of the first device and the identifier of the first device, the paging occasion on which the first device pages the second device, paging occasions on which the first device pages a plurality of second devices connected to a network by using the first device are the same, that is, the first device can page, on a same network resource, different second devices that transmit data to the network side device by using the first device, thereby reducing network resources occupied when the first device pages the second devices.

In a first possible implementation of the second aspect, the communications device is the first device, and the transmission unit is specifically configured to send the first paging message to the second device on the paging occasion on which the first device pages the second device.

With reference to the second aspect, in a second possible implementation of the second aspect, the communications device is the second device, and the transmission unit is specifically configured to receive, on the paging occasion on which the first device pages the second device, the first paging message sent by the first device.

With reference to any one of the second aspect, or the first possible implementation of the second aspect or the second possible implementation of the second aspect, in a third possible implementation, the identifier of the first device that is obtained by the obtaining unit is an international mobile subscriber identity IMSI of the first device, or an SAE-temporary mobile subscriber identity S-TMSI of the first device, or an IMSI mod A of the first device, or an S-TMSI mod A of the first device, where a value of A is a sum of a maximum value of a system frame number and one, and mod represents a modulo operation.

With reference to any one of the second aspect, or the first possible implementation of the second aspect to the third possible implementation of the second aspect, in a fourth possible implementation, the determining unit is specifically configured to determine a first frame number according to the DRX period of the first device and the identifier of the first device; and the determining unit is further configured to determine, according to the first frame number, the paging occasion on which the first device pages the second device.

With reference to the fourth possible implementation of the second aspect, in a fifth possible implementation, the determining unit is specifically configured to determine, by using a first formula, the first frame number according to the DRX period of the first device and the identifier of the first device, where the first formula is the following:

$$SFN \bmod (T \times M1) = (T/N) \times (UE\_ID \bmod N), \text{ where}$$

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; and M1≤A/T, and M1 is an integer; and a value of A is a sum of a maximum value of a system frame number and one.

With reference to the fourth possible implementation of the second aspect, in a sixth possible implementation, the determining unit is specifically configured to determine, by using a second formula, the first frame number according to the DRX period of the first device and the identifier of the first device, where the second formula is the following:

$$SFN \bmod (T \times M1) = (T/N) \times (UE\_ID \bmod N) + T \times (UE\_ID \bmod M1), \text{ where}$$

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; and M1≤A/T, and M1 is an integer; and a value of A is a sum of a maximum value of a system frame number and one.

It should be noted that the first frame number is obtained through calculation by using the second formula in the sixth possible implementation of the second aspect, so that paging occasions determined for second devices according to the first frame number can be evenly distributed in the DRX period.

With reference to the fourth possible implementation of the second aspect, in a seventh possible implementation, the determining unit is specifically configured to determine, by using a third formula, the first frame number according to the DRX period of the first device and the identifier of the first device, where the third formula is the following:

$$SFN \bmod (T \times M1) = (T/N \times M2) \times (\text{floor}(UE\_ID/M2) \bmod (N/M2)) + T/N \times (M2-1), \text{ where}$$

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

With reference to the fourth possible implementation of the second aspect, in an eighth possible implementation, the determining unit is specifically configured to determine, by using a fourth formula, the first frame number according to the DRX period of the first device and the identifier of the first device, where the fourth formula is the following:

$$SFN \bmod (T \times M1) = (T/N) \times (UE\_ID \bmod N) + T/N \times (M2-1-(UE\_ID \bmod M2)), \text{ where}$$

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

With reference to the fourth possible implementation of the second aspect, in a ninth possible implementation, the determining unit is specifically configured to determine, by using a fifth formula, the first frame number according to the DRX period of the first device and the identifier of the first device, where the fifth formula is the following:

$$SFN \bmod (T \times M1) = (T/N \times M2) \times (\text{floor}(UE\_ID/M2) \bmod (N/M2)) + T/N \times (M2-1) + T \times (UE\_ID \bmod M1), \text{ where}$$

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

With reference to the fourth possible implementation of the second aspect, in a tenth possible implementation, the determining unit is specifically configured to determine, by using a sixth formula, the first frame number according to the DRX period of the first device and the identifier of the first device, where the sixth formula is the following:

$$SFN \bmod (T \times M1) = (T/N) \times (UE\_ID \bmod N) + T/N \times (M2-1-(UE\_ID \bmod M2)) + T \times (UE\_ID \bmod M1), \text{ where}$$

SFN represents the first frame number; T represents the DRX period of the first device; UE_ID represents the identifier of the first device; N is a minimum value between T and preset nB, and nB is a value from {4T, 2T, T, T/2, T/4, T/8, T/16, T/32}; M1≤A/T, and M1 is an integer; and M2≥1, and M2 is an integer; and a value of A is a sum of a maximum value of a system frame number and one.

It should be noted that, according to the formula in any one of the seventh possible implementation of the second aspect to the tenth possible implementation of the second aspect, first frame numbers determined by a plurality of adjacent first devices may be the same, and paging occasions determined for second devices by the plurality of adjacent first devices according to the first frame number are also the same, so that the plurality of adjacent first devices page the second devices on the same paging occasion, so as to save network resources.

With reference to any one of the fourth possible implementation of the second aspect to the tenth possible implementation of the second aspect, in an eleventh possible implementation, the determining unit is specifically configured to determine a first subframe in a radio frame whose frame number is the first frame number, where a subframe number of the first subframe is the same as a subframe number of a paging occasion on which the network side device pages the first device. The determining unit is further configured to determine that an M3th subframe after the first subframe is the paging occasion on which the first device pages the second device, where M3≥1, and M3 is an integer.

With reference to any one of the fourth possible implementation of the second aspect to the tenth possible implementation of the second aspect, in a twelfth possible implementation, the determining unit is specifically configured to determine that an M4th radio frame after a radio frame whose frame number is the first frame number is a first radio frame, where M4≥0, and M4 is an integer. The determining unit is further configured to determine a first subframe in the first radio frame, where a subframe number of the first subframe is the same as a subframe number of a paging occasion on which the network side device pages the first device. The determining unit is further configured to determine that an M3th subframe after the first subframe is the paging occasion on which the first device pages the second device, where M3≥1, and M3 is an integer.

With reference to the eleventh possible implementation of the second aspect or the twelfth possible implementation of the second aspect, in a thirteenth possible implementation, the determining unit is specifically configured to determine that the M3th subframe after the first subframe is a subframe of a PRACH. The determining unit is further configured to determine that a first subframe of a non-PRACH after the subframe of the PRACH is the paging occasion on which the first device pages the second device.

It should be noted that, according to the thirteenth possible implementation of the second aspect, the first device can avoid occupying the subframe of the PRACH, and call initiation of the first device remains unaffected.

With reference to any one of the fourth possible implementation of the second aspect to the tenth possible implementation of the second aspect, in a fourteenth possible implementation, the determining unit is specifically configured to determine that an M4th radio frame after a radio frame whose frame number is the first frame number is a first radio frame, where M4≥1, and M4 is an integer. The determining unit is further configured to determine, in the first radio frame, that a subframe whose subframe number is M5 is the paging occasion on which the first device pages the second device, where 0≤M5≤9, and M5 is an integer.

With reference to the second possible implementation of the second aspect, in a fifteenth possible implementation, the obtaining unit is specifically configured to receive the DRX period of the first device and the identifier of the first device that are sent by the first device or the network side device.

With reference to the first possible implementation of the second aspect, in a sixteenth possible implementation, the transmission unit is further configured to: before sending the first paging message to the second device on the paging occasion on which the first device pages the second device, receive a second paging message sent by the network side device, where the second paging message is used by the network side device to page the second device, and the second paging message includes an identifier of the second device. The determining unit is further configured to determine, according to the identifier of the second device, that the first paging message needs to be sent to the second device.

With reference to the sixteenth possible implementation of the second aspect, in a seventeenth possible implementation, that the second paging message includes an identifier of the second device includes: the second paging message includes a paging record of paging the first device by the network side device, where the paging record of paging the first device by the network side device includes the identifier of the second device.

With reference to the sixteenth possible implementation of the second aspect, in an eighteenth possible implementation, that the second paging message includes an identifier of the second device includes: the second paging message includes a paging record of paging the second device by the network side device, where the paging record of paging the second device by the network side device includes the identifier of the second device.

According to a third aspect, an embodiment of the present invention provides a communications device, including a processor, a memory, a system bus, and a communications interface. The memory is configured to store a computer execution instruction. The processor and the memory are connected by using the system bus. When the communications device runs, the processor executes the computer execution instruction stored in the memory, so that the communications device performs the paging method according to any one of the second aspect or the implementations of the second aspect.

According to a fourth aspect, an embodiment of the present invention provides a readable medium, including a computer execution instruction. When a processor of a communications device executes the computer execution instruction, the communications device performs the paging method according to any one of the first aspect or the implementations of the first aspect.

The communications device provided in the embodiments of the present invention performs the foregoing paging method, so that the first device can page, on the same network resource, different second devices that transmit data to the network side device by using the first device, thereby reducing network resources occupied when the first device pages the second devices.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention.

DETAILED DESCRIPTION OF ILLUSTRATIVE EMBODIMENTS

The following describes the embodiments of the present invention with reference to the accompanying drawings in the embodiments of the present invention.

In the current system, there is only a paging solution in which a network side device pages a communications device, that is, a paging occasion used to page the communications device is calculated by using an identifier of the communications device, and then a paging message is sent to the communications device on the paging occasion, so as to page the communications device. A solution for how a communications device pages another communications device has not been disclosed.

Figure 1:
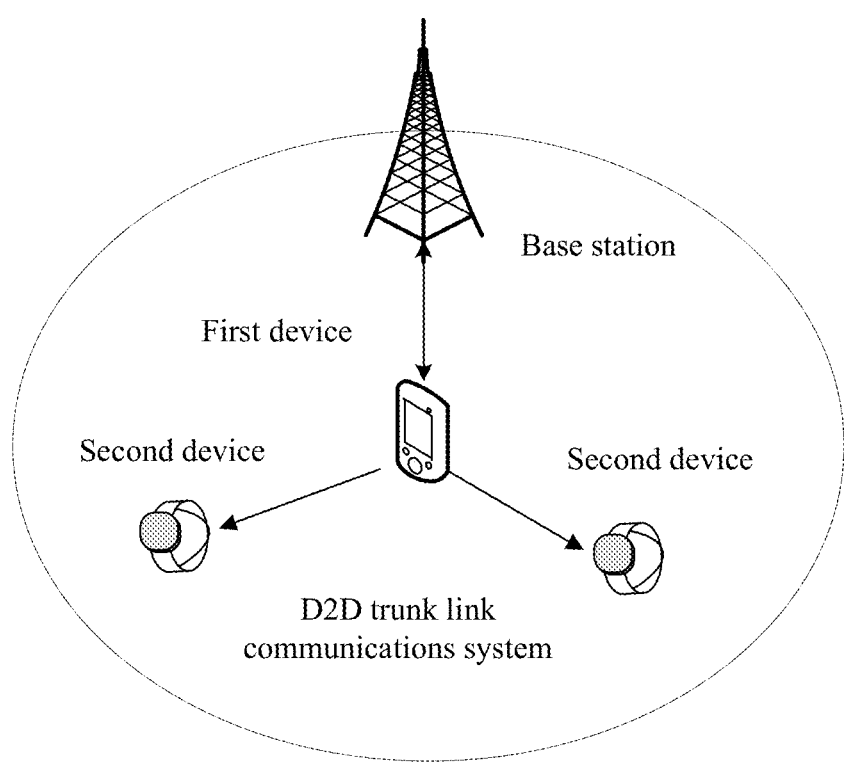
FIG. 1 shows a device-to-device (English: device-to-device, D2D for short) trunk link communications system according to an embodiment of the present invention.

FIG. 1 shows a device-to-device (D2D) trunk link communications system according to embodiments of the present invention. A communications device is used as a relay node to provide a relay service for another communications device. The relay service includes: receiving data sent by the another communications device, and forwarding the data to a network side device; and receiving data sent by the network side device, and forwarding the data to the another communications device, so as to assist the another communications device in completing data exchange between the another communications device and the network side device.

In this embodiment of the present invention, the communications device used as the relay node is referred to as a first device, and the another communications for which the relay node provides the relay service is referred to as a second device. It is assumed that the first device pages the second device in a prior-art paging manner in which the network side device pages the communications device. That is, the first device calculates, according to an identifier of the second device, a paging occasion on which the first device pages the second device, and then sends a paging message to the second device on the paging occasion. Because one first device may provide relay services for a plurality of second devices, and identifiers of the plurality of second devices may be radically different, paging occasions that are used to page the plurality of second devices and that are obtained through calculation by the first device are radically different. Therefore, the first device may need to page the plurality of second devices on a relatively large quantity of network resources, thereby affecting service transmission of the first device.

Therefore, the embodiments of the present invention provide a paging method and a device. A first device can calculate, by using an identifier and a DRX period of the first device, a paging occasion for at least one second device that transmits data to a network side device by using the first device, so that the first device can page, on a same paging occasion, different second devices that transmit data to the network side device by using the first device, thereby reducing network resources occupied when the first device pages the second devices.

In the embodiments of the present invention, the first device may be UE, a relay node, a proxy device, or the like. The UE may include but is not limited to a WD, a station, a mobile station, a subscriber unit, a personal computer, a laptop computer, a tablet computer, a netbook, a terminal, a cellular phone, a handheld device, a cordless phone, a smartphone, a personal digital assistant (PDA), a mobile Wi-Fi hotspot device (e.g., MiFi Devices), a wireless modem, a wireless router, a wireless local loop (WLL) station, and the like. The second device may be UE.

It should be noted that terms "first", "second", and "third" in this specification are merely used for a purpose of description and used to distinguish different described objects, and shall not be understood as an indication or implication of relative importance or implicit indication of a quantity of indicated technical features.

Further, before the embodiments of the present invention are described, a relationship between nouns that may be related to the embodiments of the present invention is first described, so as to help a reader understand the paging method and the device provided in the embodiments of the present invention.

In an LTE wireless communications system, because a radio frame has a period of 1024, frame numbers of radio frames are respectively numbered from 0 to 1023, that is, a system frame number ranges from 0 to 1023. Each radio frame includes 10 subframes: a subframe 0 to a subframe 9. A paging occasion is a subframe used to transmit a paging message in a radio frame.

In the following description, a paging occasion on which the network side device pages the first device may be referred to as a paging occasion for the first device, and a paging occasion on which the first device pages the second device may be referred to as a paging occasion for the second device, so as to facilitate description of the embodiments of the present invention.

An embodiment of the present invention provides a paging method. The method is applied to communications devices, and may be specifically performed by a first device in the communications devices, or may be performed by a second device in the communications devices. The second device transmits data to a network side device by using the first device, that is, the first device is used as a relay node to provide a relay service for the second device. When the first device pages the second device, the first device needs to determine a paging occasion for the second device, so as to send, to the second device on the paging occasion for the second device, a paging message used to page the second device. The second device also needs to determine the paging occasion for the second device, so that the second device can switch in time from an idle mode to an active mode on the paging occasion for the second device to receive the paging message sent by the first device, so that a process of paging the second device by the first device is complete.

Figure 2:
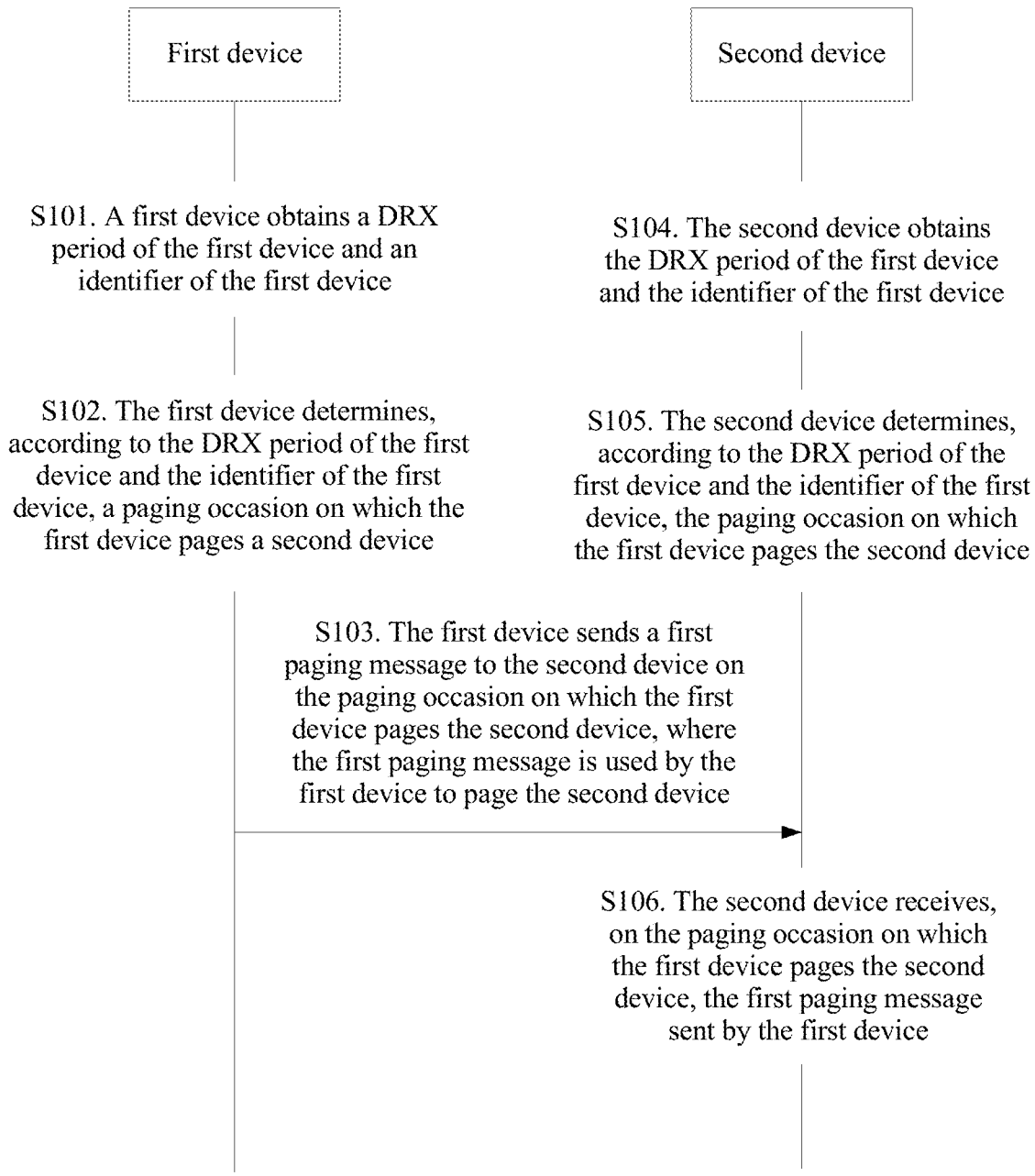
FIG. 2 is a flowchart 1 of a paging method according to an embodiment of the present invention.

Specifically, as shown in FIG. 2, the method may include the following steps.

S101. The first device obtains a DRX period of the first device and an identifier of the first device.

The identifier of the first device may be an IMSI of the first device, or an SAE-temporary mobile subscriber identity (English: Serving-Temporary Mobile Subscriber Identity, S-TMSI for short) of the first device, or an IMSI mod A of the first device, or an S-TMSI mod A of the first device, where a value of A is a sum of a maximum value of a system frame number and one, and mod represents a modulo operation.

For example, in an existing LTE system, the maximum value of the system frame number is 1023. In this case, the value of A is a sum of 1023 and 1, that is, 1024.

The first device may read the DRX period of the first device and the identifier of the first device that are stored in the first device, or may receive the DRX period of the first device and the identifier of the first device that are sent by the network side device.

S102. The first device determines, according to the DRX period of the first device and the identifier of the first device, a paging occasion on which the first device pages the second device.

It should be understood that, in this embodiment of the present invention, because the first device determines, according to the DRX period and the identifier that are of the first device, the paging occasion on which the first device pages the second device, when the first device needs to page a plurality of second devices that transmit data to the network side device by using the first device, paging occasions that are used to page the plurality of second devices and that are determined by the first device are the same, that is, the first device can page the plurality of second devices on the same paging occasion, thereby saving network resources.

Further, in this embodiment of the present invention, S102 may specifically include the following steps.

S102a. The first device determines a first frame number according to the DRX period of the first device and the identifier of the first device.

Specifically, in this embodiment of the present invention, the first device may calculate, by using a plurality of algorithms, the first frame number according to the DRX period of the first device and the identifier of the first device. The following enumerates six possible implementations (manner 1 to manner 6) for illustration purposes to describe S102a.

Manner 1: The first device calculates, by using a first formula, the first frame number according to the DRX period of the first device and the identifier of the first device, where the first formula is the following:

$$SFN \bmod (T \times M1) = (T/N) \times (UE\_ID \bmod N).$$

SFN represents the first frame number. It should be noted that, in an LTE wireless communications system, SFN is an acronym of a system frame number, and a radio frame has a period of 1024. Therefore, a value range of SFN is $0 \leq SFN \leq 1023$, and SFN is an integer. In the first formula, SFN is a value of the first frame number.

T represents the DRX period of the first device. T is measured in frames, and may take a value of 32, 64, 128, 256, or the like. UE_ID represents the identifier of the first device.

In this embodiment of the present invention, T×M1 represents a DRX period of the second device. It should be understood that the DRX period of the second device is M1 times the DRX period of the first device, so as to reduce power consumption of the first device and the second device in a process of paging the second device by the first device.

For example, in this embodiment of the present invention, M1 may be set to a power of two (that is, $2^x$, where x=1, 2, 3, ...). For example, M1 may take a value of 1, 2, 4, 8, or the like.

N is a minimum value between T and preset nB, and nB is a value from {4T, 2T, T, T/2, T/4, T/8, T/16, T/32}. M1≤A/T, and M1 is an integer; and a value of A is a sum of a maximum value of a system frame number and one.

For example, if nB=4T, N=T; or if nB=T/4, N=nB.

Manner 2: The first device calculates, by using a second formula, the first frame number according to the DRX period of the first device and the identifier of the first device, where the second formula is the following:

$$SFN \bmod (T \times M1) = (T/N) \times (UE\_ID \bmod N) + T \times (UE\_ID \bmod M1).$$

It should be noted that the first frame number is obtained through calculation by using the second formula, so that paging occasions determined for second devices according to the first frame number can be evenly distributed in the DRX period.

Manner 3: The first device calculates, by using a third formula, the first frame number according to the DRX period of the first device and the identifier of the first device, where the third formula is the following:

$$SFN \bmod (T \times M1) = (T/N \times M2) \times (floor(UE\_ID/M2) \bmod (N/M2)) + T/N \times (M2-1),\text{ where}$$

M2≥1, and M2 is an integer.

Manner 4: The first device calculates, by using a fourth formula, the first frame number according to the DRX period of the first device and the identifier of the first device, where the fourth formula is the following:

$$SFN \bmod (T \times M1) = (T/N) \times (UE\_ID \bmod N) + T/N \times (M2-1-(UE\_ID \bmod M2)).$$

Manner 5: The first device calculates, by using a fifth formula, the first frame number according to the DRX period of the first device and the identifier of the first device, where the fifth formula is the following:

$$SFN \bmod (T \times M1) = (T/N \times M2) \times (floor(UE\_ID/M2) \bmod (N/M2)) + T/N \times (M2-1) + T \times (UE\_ID \bmod M1).$$

Manner 6: The first device calculates, by using a sixth formula, the first frame number according to the DRX period of the first device and the identifier of the first device, where the sixth formula is the following:

$$SFN \bmod (T \times M1) = (T/N) \times (UE\_ID \bmod N) + T/N \times (M2-1-(UE\_ID \bmod M2)) + T \times (UE\_ID \bmod M1).$$

It should be noted that, according to the third formula, the fourth formula, the fifth formula, or the sixth formula, first frame numbers determined by a plurality of adjacent first devices may be the same, and paging occasions determined for second devices by the plurality of adjacent first devices according to the first frame number are also the same, so that the plurality of adjacent first devices page the second devices on the same paging occasion, so as to save network resources.

It should be noted that the six manners are enumerated above merely for illustration purposes to describe S102a. That is, in addition to the enumerated six manners, in this embodiment of the present invention, the first frame number may be calculated in another manner according to the DRX period of the first device and the identifier of the first device. Details are not described herein.

S102b. The first device determines the paging occasion according to the first frame number.

Specifically, in this embodiment of the present invention, the communications device may determine, by using a plurality of algorithms, the paging occasion for the second device according to the first frame number. The following enumerates three possible algorithms (manner 1, manner 2, and manner 3) for illustration purposes to describe S102b.

Manner 1: S102b may specifically include the following steps.

S10. The first device determines a first subframe in a radio frame whose frame number is the first frame number, where a subframe number of the first subframe is the same as a subframe number of a paging occasion on which the network side device pages the first device.

For example, it is assumed that the first frame number is 5, and the subframe number of the paging occasion for the first device is 3, the first subframe is a subframe 3 in a radio frame 5.

S11. The first device determines that an M3th subframe after the first subframe is the paging occasion on which the first device pages the second device, where M3≥1, and M3 is an integer.

For example, the first subframe is the subframe 3 in the radio frame 5. If M3=3, the paging occasion for the second device is a subframe 6 in the radio frame 5. If M3=7, the paging occasion for the second device is a subframe 0 in a radio frame 6. If M3=15, the paging occasion for the second device is a subframe 8 in a radio frame 6.

In should be noted that, in manner 1, if the M3th subframe after the first subframe is a subframe of a physical random access channel (PRACH), the first device determines that a first subframe of a non-PRACH after the subframe of the PRACH is the paging occasion for the second device, so that the first device can avoid occupying the subframe of the PRACH, and call initiation of the first device remains unaffected.

For example, it is assumed that a subframe 6 and a subframe 7 that are in a radio frame 5 are subframes of the PRACH, when the M3th subframe after the first subframe is the subframe 6 in the radio frame 5, the first device determines that the first subframe of the non-PRACH after the subframe 6 in the radio frame 5, that is, a subframe 8 in the radio frame 5, is the paging occasion for the second device.

If each subframe in each radio frame is the subframe of the PRACH, the first device determines that the M3th subframe after the first subframe is the paging occasion for the second device.

Manner 2: S102b may specifically include the following steps.

S20. The first device determines that an M4th radio frame after a radio frame whose frame number is the first frame number is a first radio frame, where M4≥0, and M4 is an integer.

For example, if the first frame number is 5, M4=1, and the first radio frame after the radio frame 5 is a radio frame 6, the radio frame 6 is the first radio frame.

S21. The first device determines a first subframe in the first radio frame, where a subframe number of the first subframe is the same as a subframe number of a paging occasion on which the network side device pages the first device.

For example, if the first radio frame is the radio frame 6, and the subframe number of the paging occasion for the first device is 3, the first subframe is a subframe 3 in the radio frame 6.

S22. The first device determines that an M3th subframe after the first subframe is the paging occasion on which the first device pages the second device, where M3≥1, and M3 is an integer.

For example, the first subframe is the subframe 3 in the radio frame 6. If M3=7, the paging occasion for the second device is a subframe 0 in a radio frame 7.

In should be noted that, in manner 2, if the M3th subframe after the first subframe is a subframe of a PRACH, similar to manner 1, the first device may determine that a first subframe of a non-PRACH after the subframe of the PRACH is the paging occasion for the second device, so that the first device can avoid occupying the subframe of the PRACH, and call initiation of the first device remains unaffected.

If each subframe in each radio frame is the subframe of the PRACH, the first device determines that the M3th subframe after the first subframe is the paging occasion for the second device.

Manner 3: S102b may specifically include the following steps.

S30. The first device determines that an M4th radio frame after a radio frame whose frame number is the first frame number is a first radio frame, where M4≥1, and M4 is an integer.

For example, if the first frame number is 100, M4=3, and the third radio frame after the radio frame 100 is a radio frame 103, the radio frame 103 is the first radio frame.

S31. The first device determines, in the first radio frame, that a subframe whose subframe number is M5 is the paging occasion on which the first device pages the second device, where 0≤M5≤9, and M5 is an integer.

For example, if M5=9, and the first radio frame is the radio frame 103, the paging occasion for the second device is a subframe 9 in the radio frame 103.

S103. The first device sends a first paging message to the second device on the paging occasion on which the first device pages the second device, where the first paging message is used by the first device to page the second device.

After the first device determines the paging occasion on which the first device pages the second device, the first device may transmit, on the paging occasion for the second device, the first paging message used to page the second device, that is, the first device sends the first paging message to the second device on the paging occasion for the second device, so as to page the second device.

S104. The second device obtains the DRX period of the first device and the identifier of the first device.

It should be understood that the second device needs to first obtain the DRX period of the first device and the identifier of the first device before determining the paging occasion for the second device according to the DRX period of the first device and the identifier of the first device.

Specifically, in this embodiment of the present invention, the second device may receive the DRX period of the first device and the identifier of the first device that are sent by the first device. That is, after establishing a communication connection to the first device, the second device may obtain the DRX period of the first device and the identifier of the first device by using information exchange with the first device.

It should be noted that the first device needs to send the DRX period of the first device and the identifier of the first device to the first device after establishing a communication connection to the first device. If the DRX period of the first device or the identifier of the first device is updated, the first device needs to send the updated DRX period of the first device or the updated identifier of the first device to the second device, so that the second device re-determines the paging occasion on which the first device pages the second device, so as to ensure that the paging occasion determined for the second device by the second device is more accurate.

Alternatively, the second device may receive the DRX period of the first device and the identifier of the first device sent by the network side device. That is, the network side device stores a correspondence between the first device and the second device, that is, the network side device can determine that which first device separately provides relay services for which second devices. Therefore, in this embodiment of the present invention, the network side device may send the DRX period of the first device and the identifier of the first device to the second device.

Specifically, after the second device is connected to the network side device, the network side device may send the DRX period of the first device and the identifier of the first device to the second device, so that the second device can determine the paging occasion for the second device. If the DRX period of the first device or the identifier of the first device is updated, the network side device needs to send the updated DRX period of the first device or the updated identifier of the first device to the second device, so that the second device re-determines the paging occasion on which the first device pages the second device, so as to ensure that the paging occasion determined for the second device by the second device is more accurate.

S105. The second device determines, according to the DRX period of the first device and the identifier of the first device, the paging occasion on which the first device pages the second device.

Specifically, a method in which the second device determines the paging occasion on which the first device pages the second device is exactly the same as a method in which the first device determines the paging occasion. For a specific implementation of S105, refer to the specific implementations of S102 (including S102a and S102b). Details are not described herein.

S106. The second device receives, on the paging occasion on which the first device pages the second device, the first paging message sent by the first device.

After the second device determines the paging occasion for the second device, the second device may transmit, on the paging occasion for the second device, the first paging message used to page the second device, that is, the second device switches from an idle mode to an active mode on the paging occasion for the second device to wait to receive the first paging message sent by the first device.

Figure 3:
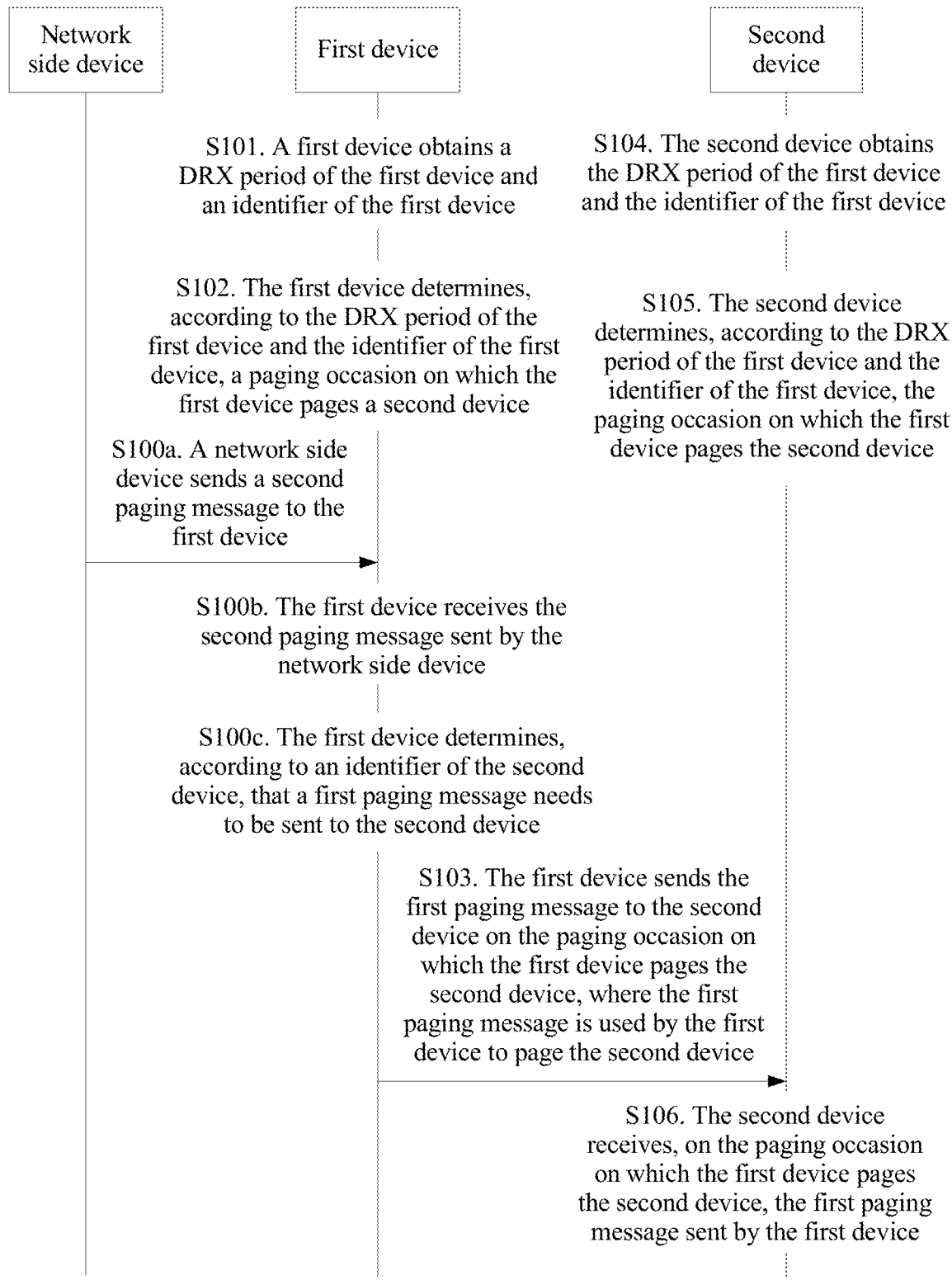
FIG. 3 is a flowchart 2 of a paging method according to an embodiment of the present invention.

Further, with reference to FIG. 2, as shown in FIG. 3, before S103, the method further includes the following steps:

S100a. The network side device sends a second paging message to the first device.

The second paging message is used by the network side device to page the second device, and the second paging message includes an identifier of the second device.

For example, the second paging message may include a paging record (English: paging record) of paging the second device by the network side device. The paging record includes the identifier of the second device and other information about the second device, for example, a core network domain.

For example, the paging record of paging the second device by the network side device may be represented as follows:

PagingRecord::={ue-Identity, cn-Domain, . . . }.

After receiving the second paging message, the first device may determine, by detecting an identifier of a device that is included in the second paging message, whether the device is the second device that transmits data to the network side device by using the first device.

Alternatively, the second paging message may include a paging record of paging the first device by the network side device. The paging record includes an identifier of the second device.

Further, this embodiment of the present invention provides a preferred solution. When the network side device needs to page a plurality of second devices that transmit data to the network side device by using the same first device, the network side device may add an identifier list of the plurality of to-be-paged second devices to the paging record of paging the first device by the network side device, so that the second paging message does not need to carry a plurality of paging records of paging the second devices by the network side device, so as to reduce a size of the second paging message, and reduce network resources occupied when the second paging message is being transmitted.

The identifier of the second device may be any identifier, in the LTE communications system, that can uniquely identify the second device, for example, an IMSI of the second device, or an S-TMSI of the second device, or a globally unique temporary identity (GUTI) of the second device. Alternatively, the identifier of the second device may be an identifier that can uniquely identify the second device from the plurality of second devices connected to the first device, for example, identifiers of the plurality of second devices connected to the same first device may be numbered in sequence, such as 0, 1, 2, . . . , 10, . . . .

For example, if the first device is UE, and the second device is a WD, a paging record of paging the UE by the network side device may be represented as follows:

PagingRecord::={ue-Identity, cn-Domain, WD_ID list, . . . }.

That is, the paging record of paging the UE by the network side device includes an identifier of the UE, an ID list of the WD, and other information about the UE, for example, a core network domain.

S100b. The first device receives the second paging message sent by the network side device.

S100c. The first device determines, according to an identifier of the second device, that a first paging message needs to be sent to the second device.

Further, after the first device receives the second paging message, and determines that the identifier of the device that is included in the second paging message is the identifier of the second device that transmits data to the network side device by using the first device, the first device determines, according to the identifier of the second device that is included in the second paging message, that the second device needs to be paged, that is, sends the first paging message to the second device.

It should be noted that, in this embodiment of the present invention, S100a to S100c may be performed before S101. In this case, each time the first device receives a second paging message sent by the network side device, the first device may determine a paging occasion for the second device, so that the paging occasion for the second device can be updated in real time to ensure accuracy of the paging occasion for the second device.

Alternatively, S100a to S100c may be performed after S102. In this case, the first device only needs to re-determine a paging occasion for the second device when the DRX period of the first device or the identifier of the first device is updated, so that computing resources of the first device can be saved, and power consumption of the first device can be reduced.

The paging method provided in this embodiment of the present invention includes: obtaining, by the communications device, the DRX period of the first device and the identifier of the first device; determining, according to the DRX period of the first device and the identifier of the first device, the paging occasion on which the first device pages the second device; and sending, by the communications device, the first paging message to the second device on the paging occasion on which the first device pages the second device, where the communications device is the first device, and the first paging message is used by the first device to page the second device; or receiving, by the communications device on the paging occasion on which the first device pages the second device, the first paging message sent by the first device, where the communications device is the second device. According to the method, because the paging occasion on which the first device pages the second device is determined by the DRX period of the first device and the identifier of the first device, paging occasions on which the first device pages a plurality of second devices that transmit data to the network side device by using the first device are the same, that is, the first device can page the plurality of second devices on the same paging occasion, thereby saving network resources.

Figure 4:
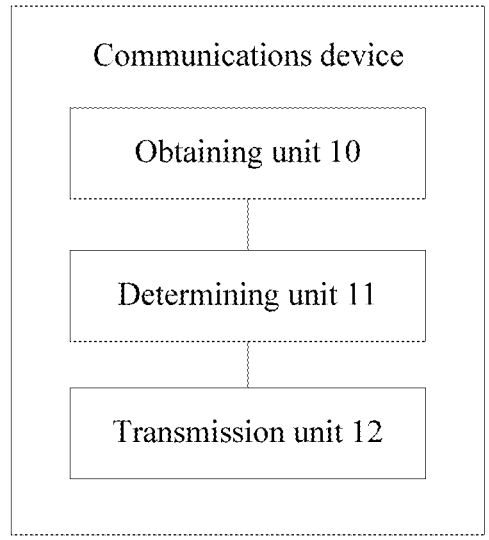
FIG. 4 is a schematic structural diagram of a communications device according to an embodiment of the present invention.

As shown in FIG. 4, an embodiment of the present invention provides a communications device. The communications device is configured to perform the steps performed by the communications device in the foregoing method. The communications device may include modules corresponding to the steps. For example, the communications device may include: an obtaining unit 10, configured to obtain a discontinuous reception DRX period of a first device and an identifier of the first device. The communications device may further include a determining unit 11, configured to determine, according to the discontinuous reception DRX period of the first device and the identifier of the first device that are obtained by the obtaining unit 10, a paging occasion on which the first device pages a second device. The communications device may further include a transmission unit 12, configured to transmit a first paging message on the paging occasion on which the first device pages the second device and that is determined by the determining unit 11. The first paging message is used by the first device to page the second device, and the communications device is the first device or the second device.

Optionally, the communications device is the first device.

The transmission unit 12 is specifically configured to send the first paging message to the second device on the paging occasion on which the first device pages the second device.

Optionally, the communications device is the second device.

The transmission unit 12 is specifically configured to receive, on the paging occasion on which the first device pages the second device, the first paging message sent by the first device.

Optionally, the identifier of the first device that is obtained by the obtaining unit 10 is an IMSI of the first device, or an S-TMSI of the first device, or an IMSI mod A of the first device, or an S-TMSI mod A of the first device, where a value of A is a sum of a maximum value of a system frame number and one, and mod represents a modulo operation.

Optionally, the determining unit 11 is specifically configured to determine a first frame number according to the DRX period of the first device and the identifier of the first device.

The determining unit 11 is further configured to determine, according to the first frame number, the paging occasion on which the first device pages the second device.

Optionally, the determining unit 11 is specifically configured to determine, by using a first formula, the first frame number according to the DRX period of the first device and the identifier of the first device, where the first formula is the following:

$$SFN \bmod (T \times M1) = (T/N) \times (UE\_ID \bmod N), \text{ where}$$

SFN represents the first frame number; T represents the DRX period of the first device; UE_ID represents the identifier of the first device; N is a minimum value between T and preset nB, and nB is a value from $\{4T, 2T, T, T/2, T/4, T/8, T/16, T/32\}$; and M1≤A/T, and M1 is an integer; and a value of A is a sum of a maximum value of a system frame number and one.

Optionally, the determining unit 11 is specifically configured to determine, by using a second formula, the first frame number according to the DRX period of the first device and the identifier of the first device, where the second formula is the following:

$$SFN \bmod (T \times M1) = (T/N) \times (UE\_ID \bmod N) + T \times (UE\_ID \bmod M1), \text{ where}$$

SFN represents the first frame number; T represents the DRX period of the first device; UE_ID represents the identifier of the first device; N is a minimum value between T and preset nB, and nB is a value from $\{4T, 2T, T, T/2, T/4, T/8, T/16, T/32\}$; and M1≤A/T, and M1 is an integer; and a value of A is a sum of a maximum value of a system frame number and one.

It should be noted that the first frame number is obtained through calculation by using the second formula, so that paging occasions determined for second devices according to the first frame number can be evenly distributed in the DRX period.

Optionally, the determining unit 11 is specifically configured to determine, by using a third formula, the first frame number according to the DRX period of the first device and the identifier of the first device, where the third formula is the following:

$$SFN \bmod (T \times M1) = (T/N \times M2) \times (\text{floor}(UE\_ID/M2) \bmod (N/M2)) + T/N \times (M2-1), \text{ where}$$

SFN represents the first frame number; T represents the DRX period of the first device; UE_ID represents the identifier of the first device; N is a minimum value between T and preset nB, and nB is a value from $\{4T, 2T, T, T/2, T/4, T/8, T/16, T/32\}$; M1≤A/T, and M1 is an integer; and M2≥1, and M2 is an integer; and a value of A is a sum of a maximum value of a system frame number and one.

Optionally, the determining unit 11 is specifically configured to determine, by using a fourth formula, the first frame number according to the DRX period of the first device and the identifier of the first device, where the fourth formula is the following:

$$SFN \bmod (T \times M1) = (T/N) \times (UE\_ID \bmod N) + T/N \times (M2-1-(UE\_ID \bmod M2)), \text{ where}$$

SFN represents the first frame number; T represents the DRX period of the first device; UE_ID represents the identifier of the first device; N is a minimum value between T and preset nB, and nB is a value from $\{4T, 2T, T, T/2, T/4, T/8, T/16, T/32\}$; M1≤A/T, and M1 is an integer; and M2≥1, and M2 is an integer; and a value of A is a sum of a maximum value of a system frame number and one.

Optionally, the determining unit 11 is specifically configured to determine, by using a fifth formula, the first frame number according to the DRX period of the first device and the identifier of the first device, where the fifth formula is the following:

$$SFN \bmod (T \times M1) = (T/N \times M2) \times (\text{floor}(UE\_ID/M2) \bmod (N/M2)) + T/N \times (M2-1) + T \times (UE\_ID \bmod M1),$$
where SFN represents the first frame number; T represents the DRX period of the first device; UE_ID represents the identifier of the first device; N is a minimum value between T and preset nB, and nB is a value from $\{4T, 2T, T, T/2, T/4, T/8, T/16, T/32\}$; M1≤A/T, and M1 is an integer; and M2≥1, and M2 is an integer; and a value of A is a sum of a maximum value of a system frame number and one.

Optionally, the determining unit 11 is specifically configured to determine, by using a sixth formula, the first frame number according to the DRX period of the first device and the identifier of the first device, where the sixth formula is the following:

$$SFN \bmod (T \times M1) = (T/N) \times (UE\_ID \bmod N) + T/N \times (M2-1-(UE\_ID \bmod M2)) + T \times (UE\_ID \bmod M1),$$
where SFN represents the first frame number; T represents the DRX period of the first device; UE_ID represents the identifier of the first device; N is a minimum value between T and preset nB, and nB is a value from $\{4T, 2T, T, T/2, T/4,$ T/8, T/16, T/32}; M1≤A/T, and M1 is an integer; and M2≥1, and M2 is an integer; and a value of A is a sum of a maximum value of a system frame number and one.

It should be noted that, according to the third formula, the fourth formula, the fifth formula, or the sixth formula, first frame numbers determined by a plurality of adjacent first devices may be the same, and paging occasions determined for second devices by the plurality of adjacent first devices according to the first frame number are also the same, so that the plurality of adjacent first devices page the second devices on the same paging occasion, so as to save network resources.

Optionally, the determining unit 11 is specifically configured to determine a first subframe in a radio frame whose frame number is the first frame number, where a subframe number of the first subframe is the same as a subframe number of a paging occasion on which a network side device pages the first device.

The determining unit 11 is further configured to determine that an M3th subframe after the first subframe is the paging occasion on which the first device pages the second device, where M3≥1, and M3 is an integer.

Optionally, the determining unit 11 is specifically configured to determine that an M4th radio frame after a radio frame whose frame number is the first frame number is a first radio frame, where M4≥0, and M4 is an integer.

The determining unit 11 is further configured to determine a first subframe in the first radio frame, where a subframe number of the first subframe is the same as a subframe number of a paging occasion on which a network side device pages the first device.

The determining unit 11 is further configured to determine that an M3th subframe after the first subframe is the paging occasion on which the first device pages the second device, where M3≥1, and M3 is an integer.

Optionally, the determining unit 11 is specifically configured to determine that the M3th subframe after the first subframe is a subframe of a PRACH.

The determining unit 11 is further configured to determine that a first subframe of a non-PRACH after the subframe of the PRACH is the paging occasion on which the first device pages the second device.

It should be noted that it is determined that the first subframe of the non-PRACH after the subframe of the PRACH is the paging occasion on which the first device pages the second device, so that the first device can avoid occupying the subframe of the PRACH, and call initiation of the first device remains unaffected.

Optionally, the determining unit 11 is specifically configured to determine that an M4th radio frame after a radio frame whose frame number is the first frame number is a first radio frame, where M4≥1, and M4 is an integer.

The determining unit 11 is further configured to determine, in the first radio frame, that a subframe whose subframe number is M5 is the paging occasion on which the first device pages the second device, where 0≤M5≤9, and M5 is an integer.

Optionally, the communications device is the second device.

The obtaining unit 10 is specifically configured to receive the DRX period of the first device and the identifier of the first device that are sent by the first device or the network side device.

Optionally, the communications device is the first device.

The transmission unit 12 is further configured to: before sending the first paging message to the second device on the paging occasion on which the first device pages the second device, receive a second paging message sent by the network side device, where the second paging message is used by the network side device to page the second device, and the second paging message includes an identifier of the second device.

The determining unit 11 is further configured to determine, according to the identifier of the second device, that the first paging message needs to be sent to the second device.

Optionally, that the second paging message includes an identifier of the second device includes the second paging message includes a paging record of paging the first device by the network side device, where the paging record of paging the first device by the network side device includes the identifier of the second device.

Optionally, that the second paging message includes an identifier of the second device includes the second paging message includes a paging record of paging the second device by the network side device, where the paging record of paging the second device by the network side device includes the identifier of the second device.

Because the communications device provided in this embodiment of the present invention can determine, according to the DRX period of the first device and the identifier of the first device, the paging occasion on which the first device pages the second device, paging occasions on which the first device pages a plurality of second devices connected to a network by using the first device are the same, that is, the first device can page, on a same network resource, different second devices that transmit data to the network side device by using the first device, thereby reducing network resources occupied when the first device pages the second devices.

Figure 5:
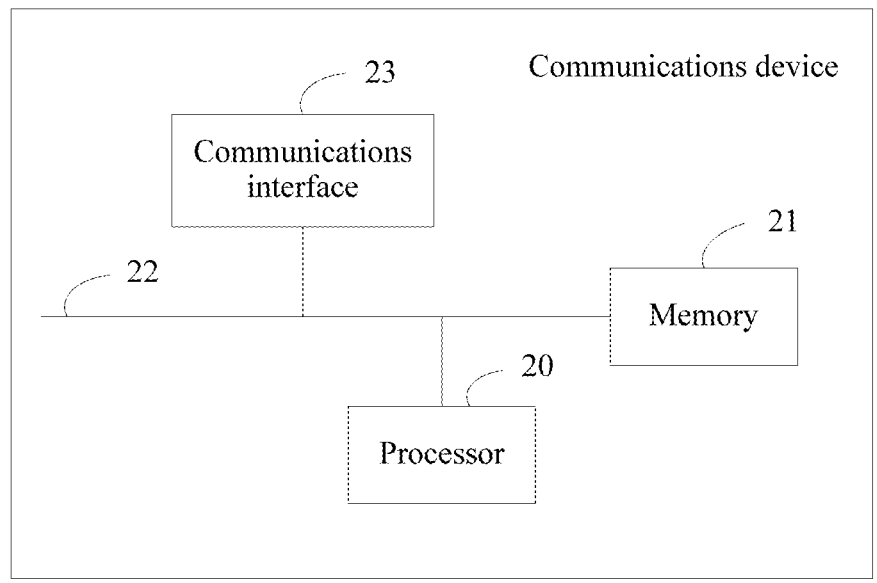
FIG. 5 is a schematic structural diagram of hardware of a communications device according to an embodiment of the present invention.

As shown in FIG. 5, an embodiment of the present invention provides a communications device, including a processor 20, a memory 21, a system bus 22, and a communications interface 23.

The memory 21 is configured to store a computer execution instruction. The processor 20 and the memory 21 are connected by using the system bus 22. When the communications device runs, the processor 20 executes the computer execution instruction stored in the memory 21, so that the communications device performs the paging method shown in FIG. 2 or FIG. 3. For details of the paging method, refer to related descriptions in the embodiment shown in FIG. 2 or FIG. 3. The details are not described herein again.

This embodiment further provides a storage medium. The storage medium may include the memory 21.

The processor 20 may be a central processing unit (English: central processing unit, CPU for short). Alternatively, the processor 20 may be another general purpose processor, a digital signal processor (English: digital signal processing, DSP for short), an application-specific integrated circuit (English: application specific integrated circuit, ASIC for short), a field programmable gate array (English: field-programmable gate array, FPGA for short) or another programmable logic device, a discrete gate or a transistor logic device, a discrete hardware component, or the like. The general purpose processor may be a microprocessor, or the processor may be any conventional processor or the like.

The processor 20 may be a dedicated processor, and the dedicated processor may include at least one of a baseband processing chip, a radio frequency processing chip, or the like. Further, the dedicated processor may include a chip that has another dedicated processing function of the communications device.

The memory 21 may include a volatile memory, for example, a random access memory (RAM). The memory 21 may include a non-volatile memory, for example, a read-only memory (ROM), a flash memory, a hard disk drive (HDD), or a solid state drive (SSD). The memory 21 may include a combination of the foregoing types of memories.

The system bus 22 may include a data bus, a power bus, a control bus, a signal status bus, and the like. In this embodiment, for clarity of description, various buses are marked as the system bus 22 in FIG. 5.

The communications interface 23 may be specifically a transceiver in the communications device. The transceiver may be a wireless transceiver. For example, the wireless transceiver may be an antenna of the communications device or the like. The communications interface 23 is used to perform data transmission and reception between the processor 20 and another device, such as between communications devices or between a communications device and a network side device.

In specific implementation, all the steps in the method procedure shown in FIG. 2 or FIG. 3 may be implemented in a manner in which the processor 20 in a form of hardware executes the computer execution instruction that is in a form of software and that is stored in the memory 21. To avoid repetition, details are not described herein.

Because the communications device provided in this embodiment of the present invention can determine, according to a DRX period of a first device and an identifier of the first device, a paging occasion on which the first device pages a second device, paging occasions on which the first device pages a plurality of second devices connected to a network by using the first device are the same, that is, the first device can page, on a same network resource, different second devices that transmit data to a network side device by using the first device, thereby reducing network resources occupied when the first device pages the second devices.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of a software function unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The storage medium is a non-transitory (English: non-transitory) medium, and includes any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    obtaining, by a communications device, a discontinuous reception (DRX) period of a first device and an identifier of the first device;
    determining, by the communications device according to the DRX period of the first device and the identifier of the first device, a paging occasion of the first device triggering the first device to page a second device on the paging occasion of the first device that is determined, wherein the second device is configured to transmit data to a network side device through the first device, and the communications device is the first device or the second device, the second device being different than the first device; and
    participating, by the communications device, in a communication of a first paging message on the paging occasion for paging, by the first device, the second device using the first paging message, wherein participating in the communication of the first paging message comprises:
        transmitting, by the communication device being the first device, the first paging message to the second device on the paging occasion of the first device to page the second device on the paging occasion of the first device; or
        receiving, by the communication device being the second device, the first paging message from the first device on the paging occasion of the first device.

2. The method according to claim 1, wherein the communications device is the first device, and wherein participating, by the communications device, in the communication of the first paging message on the paging occasion comprises:

sending, by the communications device, the first paging message to the second device on the paging occasion.

3. The method according to claim 2, wherein before transmitting, by the communications device, the first paging message on the paging occasion, the method further comprises:
receiving, by the first device, a second paging message sent by the network side device, wherein the network side device pages the second device using the second paging message, and the second paging message comprises an identifier of the second device; and
determining, by the first device according to the identifier of the second device, to send the first paging message to the second device.

4. The method according to claim 3, wherein the second paging message comprises a paging record of paging the first device by the network side device, and wherein the paging record of paging the first device by the network side device comprises the identifier of the second device.

5. The method according to claim 3, wherein the second paging message comprises a paging record of paging the second device by the network side device, and wherein the paging record of paging the second device by the network side device comprises the identifier of the second device.

6. The method according to claim 1, wherein the communications device is the second device, and wherein participating, by the communications device, in the communication of the first paging message on the paging occasion comprises:
receiving, by the communications device, on the paging occasion the first paging message sent by the first device.

7. The method according to claim 6, wherein obtaining, by the communications device, the DRX period of the first device and the identifier of the first device comprises receiving, by the second device, the DRX period of the first device and the identifier of the first device sent by the first device or the network side device.

8. The method according to claim 1, wherein the identifier of the first device is an international mobile subscriber identity (IMSI) of the first device, or an SAE-temporary mobile subscriber identity (S-TMSI) of the first device, an IMSI mod A of the first device, or an S-TMSI mod A of the first device, wherein a value of A is a sum of a maximum value of a system frame number and one, and mod represents a modulo operation.

9. The method according to claim 1, wherein determining, by the communications device according to the DRX period of the first device and the identifier of the first device, the paging occasion comprises:
determining, by the communications device, a first frame number according to the DRX period of the first device and the identifier of the first device; and
determining, by the communications device according to the first frame number, the paging occasion.

10. The method according to claim 9, wherein determining, by the communications device, the first frame number according to the DRX period of the first device and the identifier of the first device comprises:
determining, by the communications device using a first formula, the first frame number according to the DRX period of the first device and the identifier of the first device, wherein the first formula is:

$$SFN \bmod (T \times M1) = (T/N) \times (UE\_ID \bmod N), \text{wherein}$$

SFN represents the first frame number; T represents the DRX period of the first device;
UE_ID represents the identifier of the first device; N is a minimum value between T and a preset nB, the preset nB is a value from $\{4T, 2T, T, T/2, T/4, T/8, T/16, T/32\}$; $M1 \leq A/T$; a value of A is a sum of a maximum value of a system frame number and one, mod represents a modulo operation; and M1 is an integer.

11. The method according to claim 9, wherein determining, by the communications device, the first frame number according to the DRX period of the first device and the identifier of the first device comprises:
determining, by the communications device using a second formula, the first frame number according to the DRX period of the first device and the identifier of the first device, wherein the second formula is:

$$SFN \bmod (T \times M1) = (T/N) \times (UE\_ID \bmod N) + T \times (UE\_ID \bmod M1), \text{wherein:}$$

SFN represents the first frame number; T represents the DRX period of the first device; UE_ID represents the identifier of the first device; N is a minimum value between T and a preset nB; the preset nB is a value from $\{4T, 2T, T, T/2, T/4, T/8, T/16, T/32\}$; $M1 \leq A/T$; a value of A is a sum of a maximum value of a system frame number and one, mod represents a modulo operation; and M1 is an integer.

12. The method according to claim 9, wherein determining, by the communications device, the first frame number according to the DRX period of the first device and the identifier of the first device comprises:
determining, by the communications device using a third formula, the first frame number according to the DRX period of the first device and the identifier of the first device, wherein the third formula is:

$$SFN \bmod (T \times M1) = (T/N \times M2) \times (\mathrm{floor}(UE\_ID/M2) \bmod (N/M2)) + T/N \times (M2-1), \text{wherein:}$$

SFN represents the first frame number; T represents the DRX period of the first device; UE_ID represents the identifier of the first device; N is a minimum value between T and a preset nB; the preset nB is a value from $\{4T, 2T, T, T/2, T/4, T/8, T/16, T/32\}$; M1 is an integer; $M2 \geq 1$; a value of A is a sum of a maximum value of a system frame number and one, mod represents a modulo operation; and M2 is an integer.

13. The method according to claim 9, wherein determining, by the communications device, the first frame number according to the DRX period of the first device and the identifier of the first device comprises:
determining, by the communications device using a fourth formula, the first frame number according to the DRX period of the first device and the identifier of the first device, wherein the fourth formula is:

$$SFN \bmod (T \times M1) = (T/N) \times (UE\_ID \bmod N) + T/N \times (M2 - 1 - (UE\_ID \bmod M2)), \text{wherein:}$$

SFN represents the first frame number; T represents the DRX period of the first device; UE_ID represents the identifier of the first device; N is a minimum value between T and a preset nB; the preset nB is a value from $\{4T, 2T, T, T/2, T/4, T/8, T/16, T/32\}$; M1 is an integer; $M2 \geq 1$; a value of A is a sum of a maximum value of a system frame number and one, mod represents a modulo operation; and M2 is an integer.

14. The method according to claim 9, wherein determining, by the communications device, the first frame number according to the DRX period of the first device and the identifier of the first device comprises:

determining, by the communications device using a fifth formula, the first frame number according to the DRX period of the first device and the identifier of the first device, wherein the fifth formula is:

$$SFN \bmod (T \times M1) = (T/N \times M2) \times (\mathrm{floor}(UE\_ID/M2) \bmod (N/M2)) + T/N \times (M2-1) + T \times (UE\_ID \bmod M1),$$

wherein:

SFN represents the first frame number; T represents the DRX period of the first device; UE_ID represents the identifier of the first device; N is a minimum value between T and a preset nB; the preset nB is a value from {4T, 2T, T, T/2, T/4, T/8, T/16, T/32}; M1≤A/T; M1 is an integer; M2≥1; a value of A is a sum of a maximum value of a system frame number and one, mod represents a modulo operation; and M2 is an integer.

15. The method according to claim 9, wherein determining, by the communications device, the first frame number according to the DRX period of the first device and the identifier of the first device comprises:

determining, by the communications device using a sixth formula, the first frame number according to the DRX period of the first device and the identifier of the first device, wherein the sixth formula is:

$$SFN \bmod (T \times M1) = (T/N) \times (UE\_ID \bmod N) + T/N \times (M2 - 1(UE\_ID \bmod M2)) + T \times (UE\_ID \bmod M1),$$

wherein

SFN represents the first frame number; T represents the DRX period of the first device; UE_ID represents the identifier of the first device; N is a minimum value between T and a preset nB; the preset nB is a value from {4T, 2T, T, T/2, T/4, T/8, T/16, T/32}; M1≤A/T; M1 is an integer; M2≥1; a value of A is a sum of a maximum value of a system frame number and one, mod represents a modulo operation; and M2 is an integer.

16. The method according to claim 9, wherein determining, by the communications device according to the first frame number, the paging occasion comprises:

determining, by the communications device, a first subframe in a radio frame having a frame number matching the first frame number, wherein a subframe number of the first subframe matches a subframe number of the paging occasion; and determining, by the communications device, that an M3$^{th}$ subframe after the first subframe is the paging occasion triggering the first device to page the second device, wherein M3≥1, and M3 is an integer.

17. The method according to claim 16, wherein determining, by the communications device, that the M3$^{th}$ subframe after the first subframe is the paging occasion comprises:

determining, by the communications device, that the M3$^{th}$ subframe after the first subframe is a subframe of a physical random access channel (PRACH); and determining, by the communications device, that a first subframe of a non-PRACH after the subframe of the PRACH is the paging occasion.

18. The method according to claim 9, wherein determining, by the communications device according to the first frame number, the paging occasion comprises:

determining, by the communications device, that an M4$^{th}$ radio frame after a radio frame having a frame number matching the first frame number is a first radio frame, wherein M4≥0, and M4 is an integer;

determining, by the communications device, a first subframe in the first radio frame, wherein a subframe number of the first subframe matches a subframe number of the paging occasion triggering the first device to page the second device; and determining, by the communications device, that an M3$^{th}$ subframe after the first subframe is the paging occasion, wherein M3≥1, and M3 is an integer.

19. The method according to claim 9, wherein determining, by the communications device according to the first frame number, the paging occasion comprises:

determining, by the communications device, that an M4$^{th}$ radio frame after a radio frame having a frame number matching the first frame number is a first radio frame, wherein M4≥1, and M4 is an integer; and determining, by the communications device in the first radio frame, a subframe having a subframe number of M5 is the paging occasion, wherein 0≤M5≤9, and M5 is an integer.

20. A communications device, comprising:
a processor;
a non-transitory computer readable memory;
a communications interface; and
a system bus connecting the processor and the non-transitory computer readable memory storing programming for execution by the processor, the programming including instructions to:

obtain a discontinuous reception (DRX) period of a first device and an identifier of the first device;

determine, according to the DRX period of the first device and the identifier of the first device, a paging occasion of the first device triggering the first device to page a second device on the paging occasion of the first device that is determined, wherein the second device is configured to transmit data to a network side device through the first device, and the communications device is the first device or the second device, the second device being different than the first device; and participate in a communication of a first paging message on the paging occasion in paging the second device by the first device using the first paging message, participating in the communication of the first paging message comprises:

transmitting, by the communication device being the first device, the first paging message to the second device on the paging occasion of the first device to page the second device on the paging occasion of the first device; or receiving, by the communication device being the second device, the first paging message from the first device on the paging occasion of the first device.

21. The communications device according to claim 20, wherein the instructions comprise further instructions to:

determine a first frame number according to the DRX period of the first device and the identifier of the first device; and determine, according to the first frame number, the paging occasion.

22. The communications device according to claim 20, wherein the identifier of the first device is an international mobile subscriber identity (IMSI) of the first device, or an SAE-temporary mobile subscriber identity (S-TMSI) of the first device, an IMSI mod A of the first device, or an S-TMSI mod A of the first device, wherein a value of A is a sum of a maximum value of a system frame number and one, and mod represents a modulo operation.

23. The method according to claim 1, wherein transmitting, by the communication device being the first device, the first paging message to the second device comprises:
- transmitting, by the communication device, the first paging message, to a plurality of devices on the paging occasion of the first device to page the plurality of devices on the paging occasion of the first device, the plurality of devices comprising the second device, and the plurality of devices configured to communicate with the network side device through the first device.

* * * * *

UNITED STATES PATENT AND TRADEMARK OFFICE
CERTIFICATE OF CORRECTION

PATENT NO. : 10,701,665 B2
APPLICATION NO. : 15/773510
DATED : June 30, 2020
INVENTOR(S) : Cai et al.

Page 1 of 1

It is certified that error appears in the above-identified patent and that said Letters Patent is hereby corrected as shown below:

In the Claims

In Column 27, Lines 27-29, Claim 15, delete:
"SFN mod (T × M1) = (T/N) × (UE_ID mod N) + T/N × (M2 – 1 (UE_ID mod M2)) + T × (UE_ID mod M1), wherein"

And insert:
--SFN mod (T × M1) = (T/N) × (UE_ID mod N) + T/N × (M2 – 1 – (UE_ID mod M2)) + T × (UE_ID mod M1), wherein--.

Signed and Sealed this
Twenty-ninth Day of September, 2020

Andrei Iancu
*Director of the United States Patent and Trademark Office*